Figure 1:
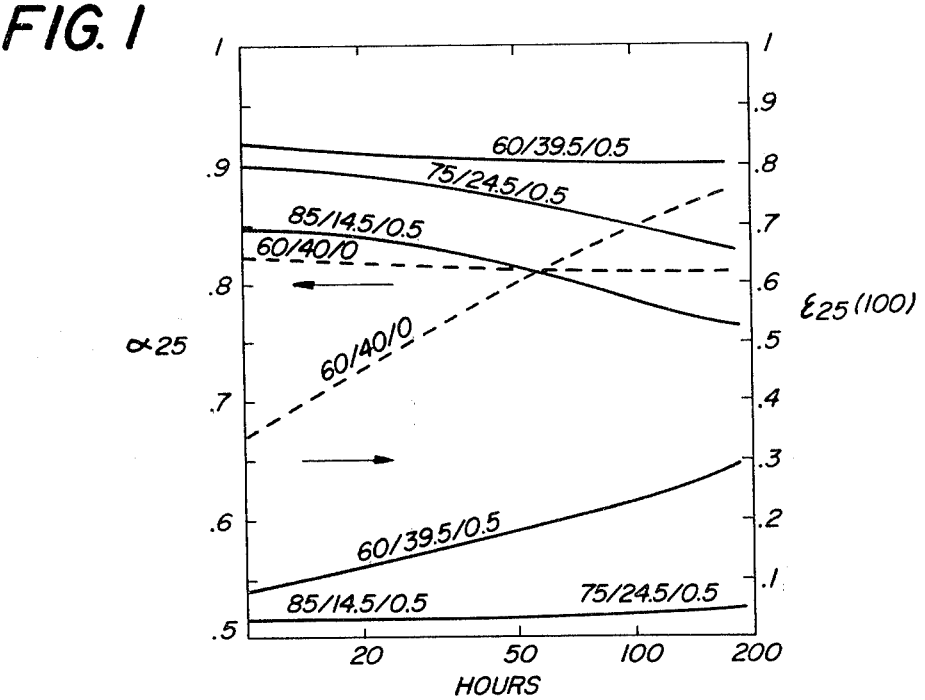

United States Patent [19]

Farrauto et al.

[11] 4,321,300
[45] Mar. 23, 1982

[54] THIN FILM SOLAR ENERGY COLLECTOR

[75] Inventors: Robert J. Farrauto, Westfield, N.J.; Joseph C. Williams, Botetourt County, Va.; Herbert Myers, South Orange, N.J.

[73] Assignee: Engelhard Minerals & Chemicals Corp., Iselin, N.J.

[21] Appl. No.: 206,125

[22] Filed: Nov. 12, 1980

[51] Int. Cl.$^3$ .............. B32B 9/00; B32B 15/04; B32B 17/06; G02B 5/24
[52] U.S. Cl. .............. 428/332; 126/430; 126/450; 126/901; 350/1.7; 427/250; 427/404; 428/432; 428/433; 428/434; 428/469; 428/472; 428/913
[58] Field of Search .............. 428/469, 472, 432, 433, 428/434, 332, 913, 458, 670, 631, 931; 126/901, 450, 430, 433, 441, 445; 350/1.7; 427/250, 404

[56] References Cited

U.S. PATENT DOCUMENTS

| | | | |
|---|---|---|---|
| 2,501,563 | 3/1950 | Colbert et al. | 427/39 |
| 2,917,817 | 12/1959 | Tabor | 428/469 |
| 3,043,112 | 7/1962 | Head | 62/56 |
| 3,118,781 | 1/1964 | Downing | 428/458 |
| 3,162,512 | 12/1964 | Robinson | 428/670 |
| 3,176,678 | 4/1965 | Langley | 126/901 X |
| 3,176,679 | 4/1965 | Langley | 126/901 X |
| 3,208,835 | 9/1965 | Duncan, et al. | 428/931 |
| 3,284,225 | 11/1966 | Smock et al. | 428/432 |
| 3,799,144 | 3/1974 | Ramsey et al. | 126/433 |
| 3,978,272 | 8/1976 | Donley | 428/434 |
| 4,062,346 | 12/1977 | Rapp, Jr. et al. | 126/441 |
| 4,087,288 | 5/1978 | Reid | 126/901 X |
| 4,090,494 | 5/1978 | Borst et al. | 126/445 |
| 4,122,239 | 10/1978 | Riboulet et al. | 428/631 |

Primary Examiner—Thomas J. Herbert, Jr.

[57] ABSTRACT

A solar energy collector having improved absorptance and emissivity levels comprising: (1) a silver-copper oxide-rhodium oxide solar absorption film, (2) a cerium oxide interlayer and a substrate of quartz, silica glass or metal. The cerium oxide interlayer minimizes agglomeration of the metal particles, maintains a relatively low thermal emittance and improves overall stability.

10 Claims, 2 Drawing Figures

SOLAR ABSORPTANCE: $\alpha_{25}$; THERMAL EMITTANCE: $\varepsilon_{25}(100)$
TIME: HOURS SOLAR ABSORPTANCE: $\alpha_{25}$; THERMAL EMITTANCE: $\varepsilon_{25}(100)$
TIME: HOURS COMPOSITION: 60Ag/39.50CuO/0.5Rh$_2$O$_2$
SOLAR ABSORPTANCE: $\alpha_{25}$; THERMAL EMITTANCE: $\varepsilon_{25}(100)$

THIN FILM SOLAR ENERGY COLLECTOR

The Government has rights in this invention pursuant to Contract Number AER-7517470 awarded by the National Science Foundation.

Solar energy devices must be efficient and inexpensive in order to compete effectively with present-day energy sources.

This invention relates to a new solar energy collector in which solar absorptance is optimized and emissivity levels are appreciably reduced. Moreover, this result is achieved with relative economy because gold components of the type described by Robert C. Langley in U.S. Pat. No. 3,176,678 are not utilized.

Specifically, this invention relates to a solar energy collector comprised of a quartz, silica or metal substrate, an absorber film containing silver, copper oxide and rhodium oxide and an interlayer or diffusion barrier of cerium oxide.

In accordance with this invention silver, copper and rhodium are blended in specific proportions and the mixture is deposited on a quartz, silica glass or metal substrate pretreated with cerium oxide. This multilayered material is then fired under atmospheric conditions to afford a solar collector which combines optimum absorption efficiencies with a minimum of re-radiation even while operating at temperatures in excess of 300° C.

Previous attempts at utilizing silver-containing films have not been entirely successful because silver particles agglomerate at high temperatures and this has had an adverse effect on the stability of the film and its emissivities.

BACKGROUND

When radiant energy from the sun strikes a surface some of it is absorbed, some of it is reflected into the atmosphere and lost, and some of it is transmitted.

One object of this invention is to provide a solar collector which can absorb essentially all of the radiant energy which reaches the earth's surface, that is, energy in the wavelength band of 0.3–2.0 microns. This absorbed energy can then be converted into heat or an electrical current via thermal-electric conversion techniques provided that the energy thus absorbed is not re-radiated into the atmosphere. Accordingly, it is desirable to utilize solar collectors which combine the advantages of high solar energy absorption with low emissivity, that is, low re-radiation.

Black bodies are known to absorb a significant amount of the energy in the solar spectrum and this would seem to indicate that such absorbers should be useful in energy collecting devices; however, black bodies also re-radiate most of their absorbed energy into the atmosphere in the form of infrared rays. Therefore, they are inefficient energy collectors.

Over the last few decades many different types of absorptive coatings or films have been devised so as to optimize solar absorptance and lower solar energy emission levels. These coatings have become known as "selective absorbers". They absorb radiant energy in the solar spectrum while at the same time they inhibit re-radiation into the atmosphere.

The principal factors affecting absorptance, emittance and thermostability are the physical and chemical properties of the absorber film, the nature of the substrate and the nature of the diffusion barrier or interlayer which lies between the said film and the said substrate.

The effectiveness of an absorptive film is measured in terms of its ability to absorb radiant energy from the sun, a property which is commonly described as "solar absorptance" ($\alpha$). A good solar absorber is one having a solar absorptance level of at least 0.9. The next most important parameter, which becomes increasingly important at high collection temperatures particularly in systems having moderate concentration ratios, is hemispherical thermal emittance or emissivity ($\epsilon$). The emissivity ($\epsilon$) should be 0.1 or less and such levels have been achieved using certain highly polished metals such as silver, gold, copper and aluminum. However, gold is very expensive and certain other of these metals at high temperatures leave the absorber film in a metastable condition resulting in a rapid deterioration of said film.

Moreover, although silver, gold, copper and aluminum exhibit very low emissivities they also absorb very little solar energy. Aluminum also suffers the disadvantage of a low melting point.

In an effort to capitalize on the low emissivity of gold Robert C. Langley in U.S. Pat. No. 3,176,678 describes the construction of a solar energy collector in which a homogeneous receiver layer of gold and glass is joined to a metal substrate via a thin layer of a refractory oxide such as cerium oxide. The resulting collector is a highly effective absorber of solar rays suitable for high temperature operations.

Unfortunately, however, the receiver layer described by Langley (U.S. Pat. No. 3,176,678) is comprised of about 80–92% gold by weight and this high concentration of precious metal makes it prohibitively expensive from a commercial standpoint.

Attempts have been made to substitute less expensive metals for gold in the absorber film of Langley (U.S. Pat. No. 3,176,678). Silver, copper and aluminum, for example, have very low emissivities and they would appear to be suitable substitutes; however, these metals absorb very little solar energy and attempts to utilize them in solar collectors have been disappointing.

Also, attempts at substituting non-metal substrates for the metals described by Langley in U.S. Pat. No. 3,176,678 have not met with success. In fact, Langley eschews the use of quartz or glass as a substrate in solar collectors because of their fragility and relatively low softening temperatures.

THE INVENTION

This invention covers a solar energy collector in which the absorber film or coating is significantly less expensive than known gold absorber films.

Moreover, from an operational standpoint, the solar collector of this invention exhibits high absorptivity, low emissivity and a resistance to degradation at temperatures in the range of 300°–600° C.

Structurally, this invention relates to a solar energy collector comprising: (1) a solar absorptive layer consisting of silver, copper oxide and rhodium oxide; (2) a quartz, glass or metallic substrate; and (3) a diffusion barrier or interlayer of cerium oxide which is in intimate contact with the said absorptive layer and said substrate.

Diffusion materials such as cerium oxide and silicon oxide have been used previously in solar energy collectors to exhance the adhesion of an absorber film to its substrate. In this invention, cerium oxide is also used to promote adhesion; however, we have found surprisingly that cerium oxide also minimizes the migration of silver on the absorptive layer thus preventing crystal growth and providing a more stable emissivity level at temperatures between 300° and 600° C.

The solar collectors of this invention having substrates comprised of quartz or silica glass exhibit particularly good solar absorptance ($\alpha_{25}$), thermal emittance levels and aging characteristics over extended periods of time. Collectors made with chromium and iron based metal substrates also exhibit good optical and thermal properties. Collectors made with fecralloy (Trademark of Allegheny-Ludlum, Pittsburgh, Pa.), an alloy consisting essentially of chromium, iron, aluminum and minor amounts of yttrium, and Kanthal A-1 (Trademark of Kanthal Corp., Sweden), a metal composition comprised of chromium, aluminum, iron and columbium, exhibit particularly good optical properties and stability in studies conducted for periods beyond 300 hours at temperatures of up to 500° C.

Over a relatively shorter period Inconel 601 (Trademark of International Nickel Corp., N.Y., N.Y.), a mixture of chromium, aluminum, iron and nickel and, also, certain stainless steels can be utilized as substrates to provide optical properties and stability comparable to that shown initially by quartz.

Known solar absorber films comprised of gold and glass in a homogeneous mixture possess surprisingly good optical properties; however, the high cost of gold has made it necessary to develop alternate systems. The requirements for these alternate systems are of a high order. The absorber film must exhibit high absorptivity, that is, a solar absorptance of about 0.9 and it should possess low emissivity, that is, a thermal emittance of less than about 0.1 over extended periods. Moreover, such films should be essentially resistant to degradation in the atmosphere and under vacuum at temperatures of up to 600° C.

The solar absorber film of this invention is comprised of silver, copper oxide and rhodium oxide. The copper oxide component provides the solar absorption properties. In studies conducted with Cu/CuO thin films, solar absorptance levels as high as 0.80 were achieved, that is, levels as high as those attained with known gold absorber films.

The silver metal component functions as an infrared reflector and in combination with copper oxide it supplements the solar absorptive properties of the latter. In studies designed to show the effectiveness of this combination the concentrations of these components were varied over a wide range and subjected to thermal aging under atmospheric conditions. The rate of decay of absorptance increased with increasing silver concentration while thermal emittance rates followed the reverse trend.

The addition of small amounts of rhodium oxide to the silver-copper oxide composition stabilizes its optical properties by minimizing agglomeration of the silver component.

Solar absorptance stability is inversely related to the concentration of the infrared reflector component, that is, the silver component. Accordingly, a 60% silver system exhibits higher initial solar absorptance and greater stability than systems having higher concentrations of silver. Thermal emittance, however, shows a reverse trend, that is, an increase in silver concentration improves emittance stability. FIG. 1 illustrates this relationship of solar absorptance to thermal emittance on a quartz substrate. These studies were conducted in air at 400° C. over a period of 200 hours. The concentrations of the components in the $Ag/CuO/Rh_2O_3$ system are expressed in weight percent.

FIG. 1 shows that films with silver concentrations on the order of 75–85% by weight possess low initial emittance values which increased slightly over a period of 200 hours.

For comparative purposes an absorber film composed of only 60% silver and 40% copper oxide and free of rhodium oxide was also tested. The optical properties of this film are shown as the two broken curves in FIG. 1. This study shows that the presence of rhodium oxide in small quantities of about 0.5% stabilizes the optical properties of the Ag/CuO absorber films.

Although the addition of rhodium oxide improves solar absorptance and stability, microscopic examination of the Ag/CuO films after 800 hours of use showed significant agglomeration of the silver component.

However, the application of the $Ag/CuO/Rh_2O_3$ composition onto a cerium oxide interlayer resulted surprisingly in an impedance of silver agglomeration and crystal growth. This proved to be an extremely effective means for reducing thermal emittances due to silver agglomeration.

Moreover, comparative testing showed that the use of cerium oxide in amounts of from about 0.1 to 2.0 $\mu m$ were most effective in controlling the agglomeration of silver particles on solar absorber films as a result of which said films exhibited higher absorptivity, lower emissivity and a resistance to degradation at temperatures of up to 600° C.

Optical Measurements

Solar absorptance ($\alpha_{25}$) and thermal emittance $\epsilon_{25}(100)$ are the primary parameters by which solar absorber films are rated.

Absorptance ($\alpha_{25}$) data was obtained by measuring the reflectance of the absorber film or coating at 25° C. in a commercial spectrophotometer. Solar absorptance was calculated from spectral reflectance data by the numerical integration of the following equation:

$$-\alpha_{25} = \int_{0.35}^{2.5} (1 - R_{25}(\lambda))F_{AM2}(\lambda)d\lambda$$

where $\lambda$ represents the wavelength of incident light, $R_{25}$ is the hemispherical reflectance measured at 25° C. and $F_{AM2}(\lambda)$ is the fraction of solar irradiance at air mass 2 in the wavelength region $d\lambda$.

The $F_{AM2}(\lambda)$ required to determine absorptance ($\alpha_{25}$) has been widely reported as, for example, by J. C. Richmond in "The Proceedings of D.O.E./D.S.T. Thermal Power System Workshop on Selective Absorber Coatings", Solar Energy Research Institute, Golden, Colorado (1977).

The specific values used in the numerical integration are set forth in Table I:

TABLE I

| Air Mass Two (AM2) Solar Irradiance Data 27 For Solar Absorptance Computations | |
|---|---|
| Wavelength ($\mu m$) | Fraction of AM2 Irradiance Falling Below Indicated Wavelength |
| .35 | .000 |
| .40 | .020 |
| .45 | .072 |
| .50 | .150 |
| .55 | .229 |

TABLE I-continued

Air Mass Two (AM2) Solar Irradiance Data
27 For Solar Absorptance Computations

| Wavelength ($\mu$m) | Fraction of AM2 Irradiance Falling Below Indicated Wavelength |
| --- | --- |
| .60 | .310 |
| .65 | .389 |
| .70 | .469 |
| .75 | .532 |
| .80 | .592 |
| .85 | .643 |
| .90 | .692 |
| .95 | .713 |
| 1.00 | .755 |
| 1.10 | .829 |
| 1.20 | .860 |
| 1.30 | .906 |
| 1.40 | .917 |
| 1.50 | .924 |
| 1.60 | .935 |
| 1.70 | .950 |
| 1.80 | .970 |
| 1.90 | .980 |
| 2.00 | .989 |
| 2.50 | 1.000 |

The accuracy and reproducibility of this technique for determining absorptance ($\alpha_{25}$) was evaluated by making several measurements on a sample of black chrome solar absorber coating. A standard deviation of 0.0025 absorptance units was determined.

The hemispherical emittance, $\alpha_{25}(100)$, for the Ag/CuO/Rh$_2$O$_3$ films of this invention were measured with a Gier Dunkle DB-100 emissometer having an accuracy of ±0.02 emittance units and a reproducibility differential of 0.005. Each reported value was corrected to the black body radiation/curve at 100° C.

The determination of absorptance and emissivity levels for solar energy collectors prepared according to this invention is illustrated in Example 3 set forth hereinafter.

Preparative Method

The solar energy collector was prepared by applying a thin layer of cerium oxide onto a substrate of quartz, silica glass or suitable metal.

Prior to the application of cerium oxide the chosen substrate, such as a quartz coupon, was first cleansed by soaking it in a cleaning solution such as Chromerge® for several minutes at room temperature. It was then rinsed thoroughly with deionized water and dried with a jet of filtered nitrogen gas.

The clean coupon was then placed on the vacuum chuck of a spin coater and a resinate solution of cerium oxide was placed on the center of the slide. The spin coater was allowed to spin for several seconds over a range of 600–2,000 RPM. This relatively low speed was utilized to afford sufficient material thickness. Under these conditions single coating layers with thicknesses of one to several tenths of a micrometer can be obtained after thermal decomposition.

The absorber film of silver-copper-rhodium oxide was spun onto the substrate in a manner essentially identical to that described for the cerium oxide interlayer. A resinate solution of Ag/CuO/Rh$_2$O$_3$ was formulated and the substrate with its CeO$_2$ layer was again rotated on the spin coater for several seconds at 600–1,000 RPM. the resinate solution was dropped onto the center of the slide in excess so as to afford a single layer of the solar absorber film at a thickness of 0.05 to 10 micrometers, that is, $\mu$m.

Following this application of the absorber film onto the cerium oxide layer the treated substrate is fired in air at temperatures in the range of 575°–600° C. After firing, the absorber film contains only silver metal, copper oxide and rhodium oxide components.

The absorber film which is impinged onto the cerium oxide interlayer is comprised of varying amounts of the metal components. We have found, for example, that the silver component may be present at a concentration of from about 50 to 90% by weight, whereas, the copper oxide may be present at a concentration of from about 9% to 49.9% by weight.

The rhodium oxide which is used to stabilize the optical properties of the film is present in lesser amounts of 0.1 to about 1.0% by weight.

According to a preferred embodiment of this invention the proportions of the respective components are varied within the following range expressed in weight percent: Ag: 55–65%; CuO: 34.3–44.7%; Rh$_2$O$_3$: 0.3 to 0.7%.

This invention will now be described by reference to specific embodiments; however, it is to be understood that these embodiments are presented solely for illustration purposes and are not intended to be limitative or restrictive.

EXAMPLE 1

Thin Film Solar Collector

Step A

Quartz-Cerium Oxide

A clean quartz coupon was placed on a spin coater and a cerium-bearing resinate was deposited in excess at its center. The spin coater was spun for ten seconds at 1,000 RPM to produce a single cerium-resinate layer.

The coupon thus treated was calcined by heating in air at a temperature in the range of 650° C. to convert the cerium resinate to cerium oxide. There was thus obtained a quartz coupon containing a single layer of cerium oxide at a thickness of 0.1–2.0 $\mu$m.

Step B

Absorber Film

A resinate solution of silver, copper and rhodium was prepared and deposited in a single layer onto the quartz-cerium oxide substrate of Step A.

The procedure used to deposit this resinate solution onto the quartz-cerium oxide interlayer was identical to the spin coating technique described in Step A. By following that procedure there was thus obtained a thin film solar collector in which the absorber coating was comprised of 60% Ag, 39.5% CuO and 0.5% Rh$_2$O$_3$ by weight.

The procedure of Example 1 was repeated except that the concentrations of the respective metal components were varied in three instances. There were thus obtained three solar collectors in which the following absorber coatings were calcined onto a cerium oxide interlayer of 0.1–2 $\mu$m thickness supported by a quartz substrate.

Absorber Film 2: 85 Ag/14.75 CuO/0.25 Rh$_2$O$_3$
Absorber Film 3: 85 Ag/14.5 CuO/0.5 Rh$_2$O$_3$
Absorber Film 4: 75 Ag/24.5 CuO/0.5 Rh$_2$O$_3$
where all values are expressed in weight percent.

The cerium oxide interlayer beneath the absorber film minimized the agglomeration of silver metal and resulted in in improvement in thermal stability.

Figure 2:
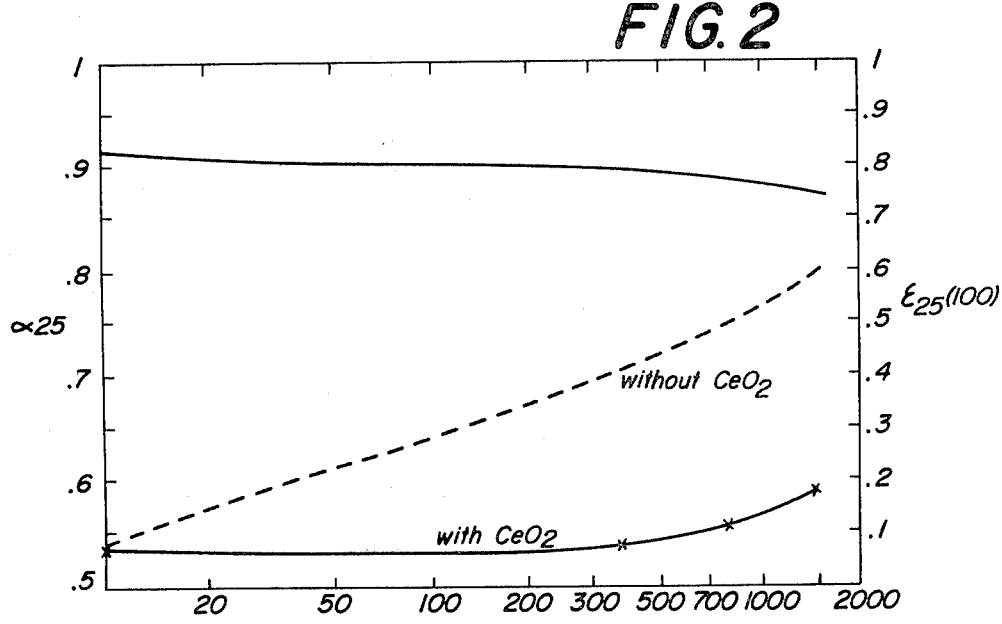

To illustrate this improvement the solar absorber film of Example 1 with its cerium oxide interlayer on a quartz substrate was compared for solar absorptance ($\alpha_{25}$) and thermal emittance $\epsilon_{25}(100)$ against an identical solar absorption film absent the cerium oxide interlayer. The results of this comparison are shown in FIG. 2. These studies were conducted in air at 500° C. over a period of 2000 hours. The concentrations of the components in the $Ag/CuO/Rh_2O_3$ system are expressed in weight-percent.

The cerium oxide interlayer proved to be an extremely effective means for minimizing thermal emittance $\epsilon_{25}(100)$. Increases previously observed at 500° C. due to silver agglomeration in the absence of cerium oxide were essentially eliminated.

The solid curves of FIG. 2 show that the solar absorptance ($\alpha_{25}$) value of 0.9 at 500° C. was essentially maintained in air while thermal emittance $\epsilon_{25}(100)$ held more or less steady at less than 0.1 after 700 hours. This represents a dramatic improvement over the control sample (broken curve) which had a thermal emittance $\epsilon_{25}(100)$ of ~0.4 under comparable test conditions free of the cerium oxide interlayer.

The extended testing of these systems up to 1500 hours continued to show superior performance for the $CeO_2$ containing system when compared with the solar absorber films without the $CeO_2$ interlayer.

On the basis of these studies it can be concluded that the addition of a $CeO_2$ interlayer on quartz substrates which contain $Ag/CuO/Rh_2O_3$ absorber films creates a barrier to the diffusion of silver and crystal growth at elevated temperatures. Accordingly, the $CeO_2$ interlayer improves film stability and renders the film more suitable for use as an absorber of radiant energy in solar collector systems.

The effect of the substrate on solar absorptance, thermal emittance and aging was determined by substituting various metal compositions for the quartz-based collector of Example 1. The absorptive film consisted of 60% Ag. 39.5% CuO and 0.5% $Rh_2O_3$ on two coats of a cerium oxide interlayer. The studies were conducted in air at a temperature of 500° C. over a period of time ranging from 0-302 hours. The metal substrates utilized in this study are set forth in Table II.

TABLE II

| | Solar Absorptance ($\alpha_{25}$) | | | Thermal Emittance ($\epsilon_{25}$) | | |
|---|---|---|---|---|---|---|
| Substrate | 0 Hrs | 60 Hrs | 302 Hrs | 0 Hrs | 60 Hrs | 302 Hrs |
| Stainless Steel 304 | 0.85 | 0.85 | *N.T. | 0.20 | 0.40 | N.T. |
| Stainless Steel 316 | 0.84 | 0.86 | N.T. | 0.15 | 0.40 | N.T. |
| Stainless Steel 408 | 0.86 | N.T. | N.T. | 0.05 | N.T. | N.T. |
| Stainless Steel 409 | 0.87 | N.T. | N.T. | 0.19 | N.T. | N.T. |
| Stainless Steel 439 | 0.85 | N.T. | N.T. | 0.10 | N.T. | N.T. |
| Inconel 601 | 0.87 | 0.85 | N.T. | 0.12 | 0.40 | N.T. |
| Fecralloy | 0.86 | 0.87 | 0.86 | 0.12 | 0.12 | 0.13 |
| Kanthal A-1 | 0.85 | 0.86 | 0.85 | 0.13 | 0.12 | 0.13 |
| Quartz | 0.87 | 0.89 | 0.87 | 0.04 | 0.06 | 0.14 |

*"N.T." indicates that no test was conducted.

The composition of the metal substrates in Table II are set forth below. All components are in a weight-percent relationship:

304 Stainless Steel (Wt.%): Mn: 2.0; Cr: 18-20; Ni: 8-10; Fe: 67.5-72.

316 Stainless Steel (Wt.%): Mn: 2.0; Cr: 16-18; Ni: 10-14; Fe: 66-72.

408 Stainless Steel (Wt.%): Mn: 0.3; Cr: 12.03; Ni: 0.2; Al: 1.36; Nb: 0.73; Ti: 0.37; Fe: 85.01.

409 Stainless Steel (Wt.%): Mn: 0.46; Cr: 10.80; Ni: 0.37; Al: 0.085; Ti: 0.43; Fe: 87.85.

439 Stainless Steel (Wt.%): Mn: 0.34; Cr: 18.70; Ni: 0.22; Al: 0.067; Ti: 0.76; Fe: 79.91.

Inconel 601 (Wt.%): Cr: 23; Ni: 61.5; Al: 1.35; Fe: 14.5.

Fecralloy (Wt.%): Cr: 15; Al: 5; Y: 0.3; Fe: 79.7.

Kanthal A-1 (Wt.%): Cr: 22; Al: 5; Co: 0.5; Fe: 72.5.

This study indicates that chromium and iron-based metals are suitable substrates for solar energy collectors.

Although this invention has been illustrated by preferred embodiments it is to be understood that modifications and variations may be made without departing from the spirit and scope of the invention. Such modifications and variations are considered to be within the purview of one skilled in the art and, accordingly, they are within the scope of the invention herein claimed.

What is claimed is:

1. A solar energy collector comprising a solar absorptive film consisting essentially of about 50-90% by weight silver, about 9-49.9% by weight copper oxide, and about 0.1-1.0% by weight rhodium oxide;
   a substrate selected from among quartz, silica, glass and metal comprising chromium and iron elements; and
   an interlayer of cerium oxide in intimate contact with said solar absorptive film and said substrate.

2. The solar energy collector of claim 1 wherein the absorptive film has the following percent by weight composition: 55-65% silver, 34.3-44.7% copper oxide and 0.3-0.7% rhodium oxide.

3. The solar energy collector of claim 1 wherein the absorptive film has the following percent by weight composition: 60% silver, 39.5% copper oxide and 0.5% rhodium oxide.

4. The solar energy collector of claim 1 wherein the thickness of the absorber film interlayer is 0.1-2.0 micrometers.

5. The solar energy collector of claim 1 wherein the thickness of the cerium oxide interlayer is 0.1-2.0 micrometers.

6. A solar energy collector according to claim 1 wherein the substrate is a metal composition consisting essentially of major amounts of chromium, iron, and nickel and minor amounts of manganese, aluminum, columbium and titanium.

7. A solar energy collector according to claim 1 wherein the substrate is a metal composition consisting essentially of major amounts of chromium and iron and minor amounts of aluminum and yttrium.

8. A solar energy collector according to claim 1 wherein the substrate is a metal composition consisting essentially of major amounts of chromium and iron and minor amounts of aluminum and cobalt.

9. A solar energy collector of claim 1 wherein the substrate is quartz or silica glass.

10. A solar energy collector according to claim 9 wherein the substrate is quartz.

* * * * *